(12) United States Patent
Uenodai et al.

(10) Patent No.: US 7,327,104 B2
(45) Date of Patent: Feb. 5, 2008

(54) CONTROL APPARATUS FOR ELECTRICALLY-POWERED VEHICLE

(75) Inventors: Asao Uenodai, Rancho Palos Verdes, CA (US); Takuya Shirasaka, Shioya-gun (JP); Tohru Ikeda, Utsunomiya (JP); Hisanori Yanagida, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/515,654

(22) Filed: Sep. 5, 2006

(65) Prior Publication Data

US 2007/0075659 A1    Apr. 5, 2007

(30) Foreign Application Priority Data

Sep. 7, 2005 (JP) .......................... P2005-258928

(51) Int. Cl.
*H02P 7/00* (2006.01)
*H01M 8/04* (2006.01)

(52) U.S. Cl. ...................... 318/139; 318/376; 318/432; 180/65.3

(58) Field of Classification Search ................ 318/139, 318/375–381, 430–434, 456–458, 461, 463–464; 180/65.1, 65.3
See application file for complete search history.

(56) References Cited

U.S. PATENT DOCUMENTS 6,388,419 B1* 5/2002 Chen et al. ................. 318/727
6,452,352 B1* 9/2002 Farkas ........................ 318/433
6,580,977 B2* 6/2003 Ding et al. .................... 701/22
6,631,960 B2* 10/2003 Grand et al. ................ 303/152
7,005,819 B2* 2/2006 Takai et al. ................. 318/432

FOREIGN PATENT DOCUMENTS

JP    11-105688    4/1999

* cited by examiner

*Primary Examiner*—Bentsu Ro
(74) *Attorney, Agent, or Firm*—Lahive & Cockfield, LLP; Anthony A. Laurentano, Esq.

(57) ABSTRACT

A control apparatus for an electrically-powered vehicle that includes an electrical motor, a motor control unit, and a traction control unit that controls a drive force so as to suppress spinning of driving wheels based on an operation request, includes: a driver requesting torque calculation unit that calculates a driver requesting torque; a traction requesting torque calculation unit that calculates a traction requesting torque; a torque command calculation unit that calculates a torque command based on the operation request, the driver requesting torque, and the traction requesting torque, during execution of the drive force control by the traction control unit; and a revolution rate sensor, wherein the torque command calculation unit is adapted to set the torque command to a value greater than zero regardless of the operation request when the revolution rate of the electrical motor is less than or equal to a predetermined value.

1 Claim, 3 Drawing Sheets

CONTROL APPARATUS FOR ELECTRICALLY-POWERED VEHICLE

BACKGROUND OF THE INVENTION

1. Field of the Invention

The present invention relates to control apparatus for electrically-powered vehicle.

Priority is claimed on Japanese Patent Application No. 2005-258928, filed Sep. 7, 2005, the content of which is incorporated herein by reference.

2. Description of Related Art

Conventional control devices that increase the gripping force of driving wheels by limiting the output of a driving motor (see, for example, Published Japanese Patent No. 3446559) are well known as devices for controlling the regenerative torque due to the regenerative operation of driving motor and for traction control for suppressing spinning of the driving wheel when an excessively large driving force acts on the road surface from the tires in hybrid vehicles that transmit the driving force of the driving motor or internal combustion engine to the driving wheels when an internal combustion engine or an electrical motor is provided as the drive source.

However, in a vehicle installed with only a driving motor with no internal combustion engine as the drive source, such as for example, in an electrically-powered vehicle such as a fuel cell vehicle or an electric vehicle installed with fuel cells or storage device used as the power source of the driving motor, the selection of reverse (R) position can be permitted as a transmission operation by the driver during forward running, and the running state of the vehicle can be set so as to move smoothly and continuously from the forwarding state to the reversing state through the stop state by the regenerative operation of the driving motor in the normal rotation state as running control to suit the will of the driver.

In vehicles where the running state can be changed over from the forwarding state to the reversing state smoothly by the regenerative operation of the driving motor in this way, for example, when traction control is executed to increase the gripping force of the driving wheels by controlling the regenerative torque by the regenerative operation of the driving motor according to the spinning of the driving wheels when the vehicle starts, and for example, if the condition of the driving wheels suddenly changes to the gripping condition to suit the conditions of the road surface, such as the friction coefficient and the unevenness of the road surface, the stop of the regenerative operation of the driving motor may be delayed to ensure the gripping condition, and the regenerative operation of the driving motor may continue even when the vehicle speed and the wheel speed are almost zero. In this case, the driving motor performs regenerative operation in the stop state of the vehicle, which may lead to a problem in that the vehicle starts reversing against the will of the driver who is trying to start the vehicle in the forward direction.

SUMMARY OF THE INVENTION

The present invention has been made in consideration of the above circumstances, and an object thereof is to provide a control device of electrically-powered vehicle that appropriately reflects the driver's will in the running state of the vehicle when traction control is executed.

To resolve the aforementioned problems and to achieve the object, the present invention provides a control apparatus for an electrically-powered vehicle that includes an electrical motor that drives the vehicle, a motor control unit that controls drive and regenerative operations of the electrical motor based on a torque command that is a command value for a torque output by the electrical motor, and a traction control unit that controls a drive force that acts between tires and a road surface and suppresses spinning of driving wheels based on an operation request that indicates an operation state of the electrical motor, wherein the motor control unit is adapted to continuously change over the operation state of the electrical motor from a normal rotation state to a reverse rotation state through a stop state when the torque command is negative, the control apparatus including: a driver requesting torque calculation unit that calculates a driver requesting torque, which is a command value for the torque output by the electrical motor, according to an opening degree of accelerator related to an amount of accelerator operation by a driver; a traction requesting torque calculation unit that calculates a traction requesting torque, which is a command value for the torque output by the electrical motor, according to a drive force control by the traction control unit; a torque command calculation unit that calculates the torque command based on the operation request, the driver requesting torque, and the traction requesting torque, during execution of the drive force control by the traction control unit; and a revolution rate sensor that measures a revolution rate of the electrical motor, wherein the torque command calculation unit is adapted to set the torque command to a value greater than zero regardless of the operation request when the revolution rate of the electrical motor or a conditional value related to the revolution rate is less than or equal to a predetermined value.

According to the control apparatus for the electrically-powered vehicle mentioned above, if the motor revolution rate when drive force control is executed by the traction control unit is less than or equal to a predetermined value, the torque command calculation unit sets the torque command value above zero regardless of the operation request of the electrical motor output from the traction control unit; that is, even if the regenerative operation of the electrical motor is required by the operation request, the torque command is prevented from becoming a negative value. For this reason, when the torque command is maintained in the negative value (or positive value) state corresponding to the execution request of regenerative operation (regeneration request) for the electrical motor in the normal rotation state (or reverse rotation state), even if the operation state of the electrical motor has been set so as to change over continuously from the normal rotation state (or reverse rotation state) through the stop state to the reverse rotation state (or normal rotation state), the electrical motor in the normal rotation state can be prevented from changing over to the reverse rotation state in response to the regeneration request output from the traction control unit, during the execution of drive force control by the traction control unit. That is, when the execution of traction control is started corresponding to spinning of the driving wheels when the vehicle moves forward, the motor output is restricted by the regeneration request output from the traction control unit. The gripping force of the driving wheels can be adequately increased, the excessive action of the regenerative operation of the electrical motor according to this regeneration request can be prevented, and the driver's will can be appropriately reflected in the running state of the vehicle.

As described above, according to the control apparatus for an electrically-powered vehicle of the present invention, when the torque command is maintained at a negative value (or a positive value) according to the execution request (regeneration request) of regenerative operation for the electrical motor in the normal rotation state (or reverse rotation state) or at the settable running state in the electrically-powered vehicle, while the operation state of the electrical motor can be permitted to change over continuously from the normal rotation state (or reverse rotation state) to the reverse rotation state (or normal rotation state) through the stop state, the vehicle can be prevented from changing over to the reversing state against the will of the driver during the execution of traction control that appropriately and speedily increases the gripping force of the driving wheels by the regenerative operation of the electrical motor, and the will of the driver can be appropriately reflected in the running state of the vehicle.

BRIEF DESCRIPTION OF THE DRAWINGS

FIG. 3A shows an example of comparison, while FIG. 3B shows an embodiment of the present invention.

DETAILED DESCRIPTION OF THE INVENTION

The control apparatus for the electrically-powered vehicle related to an embodiment of the present invention is described herein referring to the attached figures.

Figure 1:
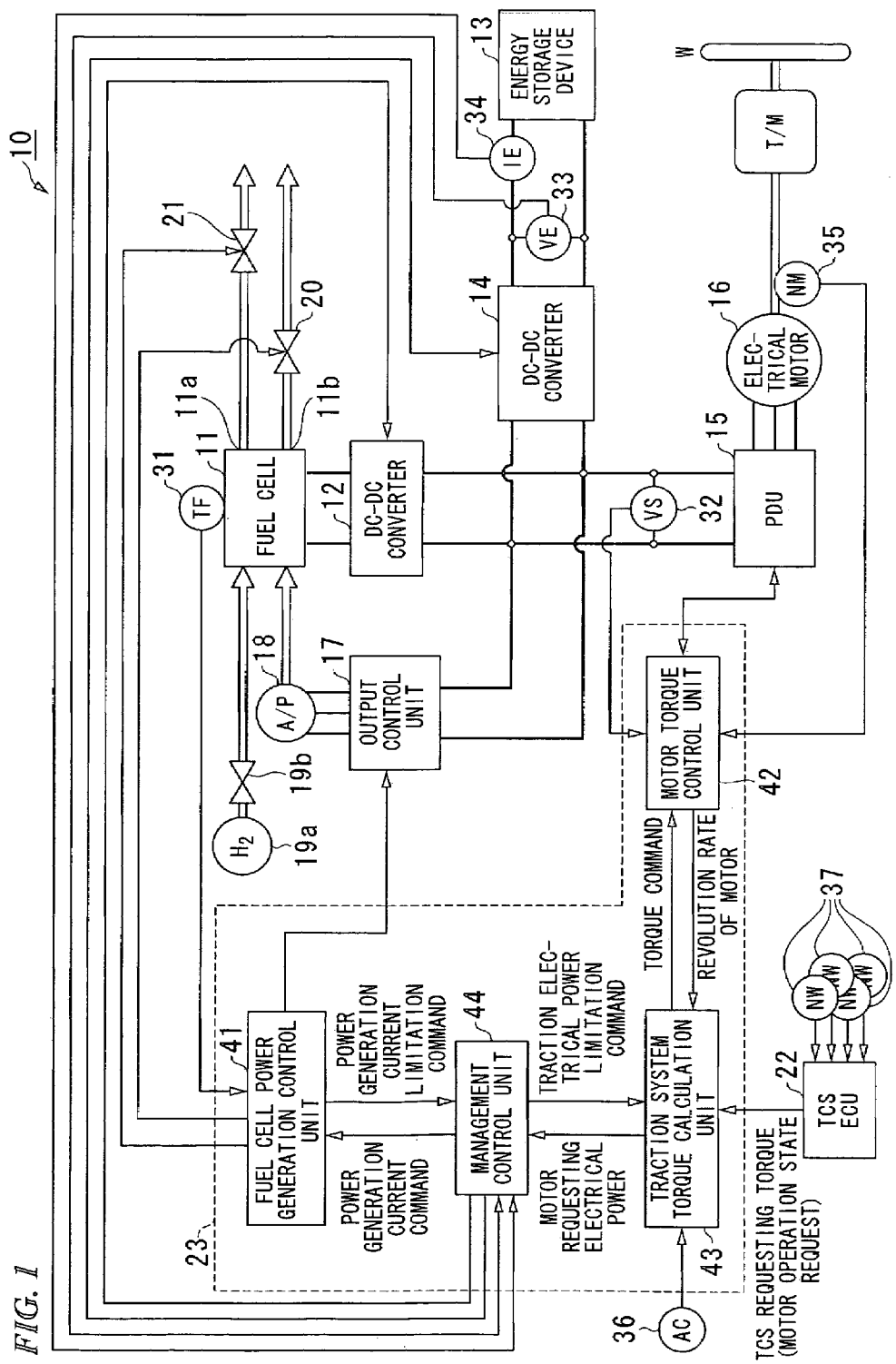
FIG. 1 is a schematic diagram showing the configuration of a control apparatus for an electrically-powered vehicle related to an embodiment of the present invention.

As shown in FIG. 1, a control apparatus 10 for an electrically-powered vehicle according to the present embodiment includes a fuel cell 11, a first DC-DC converter 12, an energy storage device 13, a second DC-DC converter 14, a power drive unit (PDU) 15, an electrical motor 16, an output control unit 17, an air supply unit (A/P) 18, a hydrogen tank 19a and a hydrogen supply valve 19b, a back pressure valve 20, a purge valve 21, TCSECU 22, a control device 23, a fuel cell temperature sensor 31, a system voltage sensor 32, a terminal voltage sensor 33, a current sensor 34, a motor revolution rate sensor 35, an accelerator opening degree sensor 36, and wheel speed sensors 37.

The control device 23 includes, for example, a fuel cell power generation control unit 41, a motor control unit 42, a traction system torque calculation unit 43, and a management control unit 44.

The fuel cell 11 includes a pair of end plates and a stacked body that is sandwiched by the pair of end plates in a direction of stacking. The stacked body includes stacked fuel cell units, each of which includes a pair of separators and an electrolytic electrode assembly that is sandwiched by the pair of separators. Each electrolytic electrode assembly includes a fuel electrode (anode) having an anode catalyst and a gas diffusion layer, an oxygen electrode (cathode) having a cathode catalyst and a gas diffusion layer, and a solid polymer electrolyte membrane, e.g., a cation exchange membrane, that is sandwiched by the fuel electrode and the oxygen electrode.

Air, that is, oxidizing gas (reaction gas) including oxygen, is supplied from the air supply unit 18 including air compressor or the like, to the cathode of fuel cell 11. A fuel gas (reaction gas) including hydrogen is supplied from the high pressure hydrogen tank 19a through the hydrogen supply valve 19b.

Hydrogen ionized in the catalytic reaction on the anode catalyst of the anode is moved to the cathode through the appropriately humidified solid polymer electrolyte membrane, electrons generated with this movement are removed to the external circuit, and utilized as direct current electric energy. At this stage, hydrogen ions, electrons and oxygen react and form water at the cathode.

The hydrogen supply valve 19b is an air-operated proportional pressure control valve. With the pressure of air supplied from the air supply unit 18 as the signal pressure, the hydrogen that passes the hydrogen supply valve 19b is set such that the pressure at the outlet of the hydrogen supply valve 19b becomes the pressure of the predetermined range corresponding to the signal pressure.

Moreover, the air supply unit 18, which may be an air compressor, compresses air taken in from outside the vehicle for example, and supplies it to the cathode of fuel cell 11 as the reaction gas.

The revolution rate of the electrical motor (not shown in the figures) that drives the air supply unit 18 is controlled by the output control unit 17 that includes a pulse width modulated inverter modulated by pulse width modulation (PWM), based on the control command input from the fuel cell power generation control unit 41 of the control device 23.

The discharge gas discharged from the hydrogen outlet of fuel cell 11 is led to the dilution box (not shown in the figures) through the discharge control valve (not shown in the figures) the opening and closing of which are controlled by the fuel cell power generation control unit 41 of the control device 23.

A part of the unreacted discharge gas discharged from the hydrogen outlet 11a of the fuel cell 11 is led to the circulating flow path provided with a circulation pump (not shown in the figures), ejector (not shown in the figures), or the like, mixed with the hydrogen supplied from the hydrogen tank 19 and the discharge gas discharged from the fuel cell 11, and again supplied to the fuel cell 11.

The unreacted discharge gas discharged from the air outlet 11b of the fuel cell 11 is discharged outside (to the atmosphere and so on) through the back pressure valve 20, the opening of which is controlled by the fuel cell power generation control unit 41 of the control device 23.

The first DC-DC converter 12 may include a chopper type power conversion circuit. For example, the value of the output current extracted from the fuel cell 11 is controlled by the chopping operation of the chopper type power conversion circuit, namely the ON/OFF operation of the switching element provided in the chopper type power conversion circuit. This chopping operation is controlled according to the duty of the control pulse input from the management control unit 44 of the control device 23, that is, according to the ON/OFF ratio.

For example, if the duty of the control pulse input from the management control unit 44 is set as 0% when the extraction of output current from the fuel cell 11 is prohibited, the switching element provided in the chopper type power conversion circuit is fixed in the OFF state, and the fuel cell 11 and the PDU 15 are electrically disconnected. On the other hand, when the duty of the control pulse is taken as 100%, and the switching element is fixed in the ON state, the fuel cell 11 and the PDU 15 are directly connected, and values of the output voltage of the fuel cell 11 and the input voltage of the PDU 15 become equal.

Also, if the duty of the control pulse is set at an appropriate value between 0% and 100%, the first DC-DC converter 12 restricts the output current of fuel cell 11 taken as the primary side current according to the duty of the control pulse, and outputs the restricted current as the secondary side current.

The energy storage device 13 may be a capacitor formed by electric double layer capacitors or electrolytic capacitors, or a battery, and it is connected in parallel with the first DC-DC converter 12 and PDU 15 through the multi-directional second DC-DC converter 14.

The second DC-DC converter 14 reduces VS, the voltage of the system based on the regenerative operation of motor 15 or the power generated by the fuel cell 11, and can charge the energy storage device 13. It can also increase VE, the terminal voltage of the energy storage device 13. For this reason, the measured signal output by the terminal voltage sensor 33 that measures the terminal voltage VE of the energy storage device 13 and by the current sensor 34 that outputs the charging current of energy storage device 13 and measures the discharge current, are input to the management control unit 44 of the control device 23.

As a result, the fuel cell 11 and the energy storage device 13 that form the fuel cell system are regarded as power sources of electrical motor 16.

PDU 15 may include a PWM inverter by pulse width modulation (PWM), which controls the regenerative operation and drive of electrical motor 16, according to the control commands output by the motor torque control unit 42 of the control device 23. This PWM inverter includes a bridge circuit that may be formed by connecting bridges using multiple switching elements of transistor. For example, when driving the electrical motor 16, it converts the direct current power output by the second DC-DC converter 14 and the first DC-DC converter 12 to three-phase alternating current power based on the pulse width modulation signals input by the motor torque control unit 42, and supplies it to the electrical motor 16. On the other hand, during regeneration of the electrical motor 16, the three-phase alternating current power output by electrical motor 16 is converted to direct current power and supplied to the energy storage device 13 through the second DC-DC converter 14 to charge the energy storage device 13.

The electrical motor 16 may be a three-phase alternating current synchronous motor of the permanent magnet-type using permanent magnets for the magnetic field. It is driven and controlled by the three-phase alternating current power supplied by PDU 15, and when drive power is transmitted to the electrical motor 16 from the driving wheels W side during deceleration of the vehicle, the motor 15 acts as a generator; that is, it generates regenerative brake force, and recovers the kinetic energy of the vehicle body as electric energy.

TCSECU 22 calculates the conditional value related to spinning state of the driving wheels W, such as the difference in revolution rate (an amount of slip) in the driving wheels W and the driven wheel, based on the measured signals output by the multiple wheel speed sensors 37 that measure the revolution rate (wheel speed NW) of each wheel of the vehicle. After referring to predetermined TCS requesting torque maps set beforehand, such as for example the map showing the correspondence relationship between the torque necessary for ensuring a predetermined gripping force for the road surface of the driving wheels W and the amount of slip, the Traction Control System (TCS) requesting torque TT, which is the command value for torque output by the electrical motor 16, is calculated.

For example, in the predetermined TCS requesting torque map, the TCS requesting torque TT is set such that it tends to change to lower values as the amount of slip increases.

When the difference in rotation speed (the amount of slip) between the driving wheels W and the driven wheel exceeds the predetermined value, traction control, that is, the driving force of driving wheels W, is reduced corresponding to the TCS requesting torque TT, an excessively large driving force acts on the road surface from the tire of the driving wheels W, and the requesting command (motor operation state request) for the operation state of electrical motor 16 (namely, drive or regenerative operation) when control is executed for inhibiting spinning of driving wheels W, is set as the sign of TCS requesting torque TT in the TCSECU 22.

For example, if the sign of the TCS requesting torque TT is positive for the electrical motor 16 in the normal rotation state, a powering operation, i.e., a drive operation is specified; and if the sign is negative, a regenerative operation is specified. For electrical motor 16 in the reverse rotation state, a regenerative operation is specified if the sign of TCS requesting torque TT is positive, and a drive operation is specified if the sign is negative.

TCSECU 22 outputs the flag value of TCS execution flag indicating whether the traction control is in the execution state or not (for example, "1" is output if the traction control is in the execution state, and "0" is output if in the non-execution state).

The fuel cell power generation control unit 41 of the control device 23 outputs the command value for the flow rate and pressure of reaction gas supplied to the fuel cell 11 from the air supply unit 18 and the command value for the valve opening of the back pressure valve 20, as power generation command for the fuel cell 11, based on, for example, the operation condition of the vehicle, the concentration of hydrogen included in the reaction gas supplied to the anode of the fuel cell 11, the concentration of hydrogen included in the discharge gas discharged from the anode of the fuel cell 11, the power generation current command input from the management control unit 44, and the power generating conditions of the fuel cell 11 such as the voltage between the terminals of the each of the multiple fuel cells, the output current value extracted from the fuel cell 11, and the internal temperature TF of the fuel cell 11, and controls the power generating condition of the fuel cell 11.

In addition, the fuel cell power generation control unit 41 calculates the upper limit of the generated power value that can be generated by the fuel cell 11, based on each measured value of flow rate and pressure of reaction gas supplied to the fuel cell 11 (actual flow rate and actual pressure) corresponding to the power generation current command from the management control unit 44, and outputs the signal indicating the restrictions on the output current (power generation current limitation command) extracted from the fuel cell corresponding to this upper limit to the management control unit 44.

The motor torque control unit 42 of the control device 23 controls the power conversion operation of the PWM inverter provided in PDU 15. For example, the traction requesting output, which is necessary for output of the torque corresponding to the torque command, is calculated based on the torque command input by the traction system torque calculation unit 43, and the switching command formed by various pulses that drive the ON/OFF operations of various switching elements of the PMW inverter by pulse width modulation (PWM) (that is, pulse width modulation signal) is set according to the traction requesting output.

Next, when the switching command is input to PDU 15 from the motor torque control unit 42 of control device 23, current is sequentially commutated to the stator winding (not shown in the figures) of each phase of the electrical motor 16. Thus, the magnitude (that is, amplitude) and the phase of impressed voltage of each of the U, V, and W phases are controlled, and the phase current of each of the U, V, and W phases is conducted to each phase of electrical motor 16.

For this reason, the measured signal output by the system voltage sensor 32 that measures the system voltage VS, which is taken as the input voltage for PDU 15 for example, and the measured signal output by motor revolution rate sensor 35 that measures the revolution rate NM of electrical motor 16 are input to the motor torque control unit 42 of the control device 23.

The motor torque control unit 42 outputs the measured signal of revolution rate NM of the electrical motor 16 input from the motor revolution rate sensor 35 to the traction system torque calculation unit.

The motor control unit 42 can be controlled such that operation state of the electrical motor 16 is changed over continuously and smoothly from the normal rotation state (or reverse rotation state) to the stop state through the reverse rotation state (or normal rotation state), when the torque command TR is maintained in a negative value (or positive value condition) according to the execution request of regenerative operation (regeneration request) for electrical motor 16 in the normal rotation state (or reverse rotation state).

The traction system torque calculation unit 43 of the control device 23 calculates the driver requesting torque TD as the command value for the torque output by electrical motor 16, based on the measured signal output by the accelerator opening degree sensor 36 that measures an opening degree AC of accelerator related to an amount of accelerator operation by the driver and on the measured signal output by the motor revolution rate sensor 35, referring to maps such as the driver requesting torque map indicating the predetermined correspondence relationship of the previously-set opening degree AC of accelerator, the revolution rate NM, and the driver requesting torque TD. The traction system torque calculation unit 43 selects the smaller of the driver requesting torque TD or the TCS requesting torque TT, based on the TCS requesting torque TT input from TCSECU 22 and the driver requesting torque TD, and sets it as the torque command TR, which is the command value for the torque output by the electrical motor 16.

When selecting the smaller of either the TCS requesting torque TT or the driver requesting torque TD, if the TCS requesting torque TT is smaller than the driver requesting torque TD, the traction system torque calculation unit 43 determines whether the rotation speed (wheel speed NW) of each wheel output by the multiple wheel speed sensors 37 is less than the predetermined regenerative operation prohibition wheel speed or not. If the result is "NO", then it sets the TCS requesting torque TT as the torque command TR.

On the other hand, if the result is "YES," it sets the value of the torque command TR as greater than zero.

That is, when the torque command TR is maintained in the negative value (or positive value) state corresponding to the execution request (regeneration request) of regenerative operation for electrical motor 16 in the normal rotation state (or reverse rotation state), even if the operation state of the electrical motor 16 has been set so as to change over continuously from the normal rotation state (or reverse rotation state) through the stop state to the reverse rotation state (or normal rotation state), and the TCS requesting torque TT is output from TCSECU 22, that is, the value of the TCS operation flag has been set at "1," and traction control has been executed, the regenerative operation of the electrical motor 16 is prevented from operating excessively and from changing over from normal rotation state to reverse rotation state, according to the TCS requesting torque TT output from TCSECU 22.

Moreover, the traction system torque calculation unit 43 sets the motor requesting electrical power PM, which is a parameter for controlling the supply condition of the reaction gas of fuel cell 11 that indicates the consumed power of electrical motor 16, according to the drive power of electrical motor 16, that is, according to the torque command TR, or irrespective of the drive power of electrical motor 16, that is torque command TR, and outputs to the management control unit 44.

The management control unit 44 of the control device 23 outputs control pulses that control the power conversion operation of the first DC-DC converter 12, based on the power generation current limitation command related to the upper limit of the power that can be generated from the fuel cell 11 input from the fuel cell power generation control unit and the motor requesting electrical power PM input from the traction system torque calculation unit 43, controls the value of the output current extracted from the fuel cell 11, outputs the control pulse that controls the power conversion operation of the second DC-DC converter 14, and controls the charging and discharging of the energy storage device 13.

The management control unit 44 of the control device 23 outputs power generation current command that indicates the generated power current of fuel cell 11 to the fuel cell power generation control unit 41, based on the motor requesting electrical power PM input from the traction system torque calculation unit 43, the auxiliaries requesting electrical power corresponding to the power consumed in the auxiliaries made up of various electric loads provided in the vehicle, and the dischargeable power from the energy storage device 13.

Also, the management control unit 44 outputs the traction electrical power limitation command as a signal indicating the limit of consumed power of electrical motor 16 to the traction system torque calculation unit 43, based on the power generation current limitation command input from the fuel cell power generation control unit 41 and the auxiliaries requesting electrical power.

For this reason, various measured signals output from the terminal voltage sensor 33 that measures the terminal voltage VE of the energy storage device 13 and from the current sensor 34 that measures the discharging current and the charging current of the energy storage device 13 are input to the management control unit 44 of the control device 23.

The control apparatus 10 for the electrically-powered vehicle according to the embodiment of the present invention is configured as described above. Next, the operation of the control apparatus 10 for the electrically-powered vehicle, especially the processes for setting the torque command TR, which is the command value for torque output from the electrical motor 16, are explained referring to the attached drawings.

Figure 2:
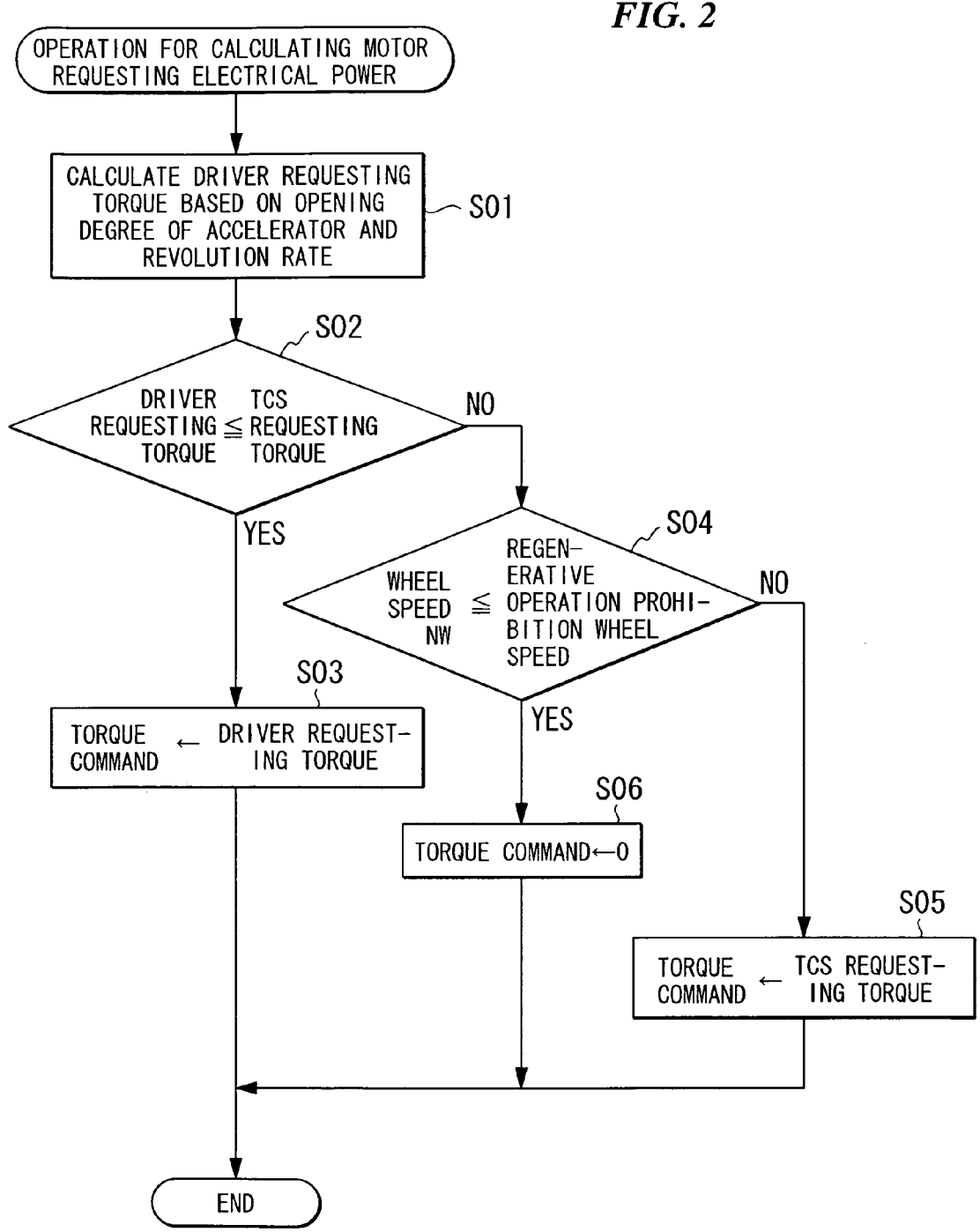
FIG. 2 is a flowchart showing the operation of the control apparatus for the electrically-powered vehicle related to the embodiment of the present invention.

Firstly, the driver requesting torque TD is calculated as the command value for torque output by the electrical motor 16, referring to maps such as the preset driver requesting torque map, based on the opening degree AC of accelerator, and the revolution rate NM of the electrical motor 16 in the step S01 shown in FIG. 2.

Next, in step 02, the calculated driver requesting torque TD is checked to confirm whether it is less than the TCS requesting torque TT output by TCSECU 22.

If the result is "YES," the process proceeds to step S03 and in this step, the driver requesting torque TD is set as the torque command TR, which is the command value for the torque output by the electrical motor 16, and a series of processes is completed.

On the other hand, if the result is "NO," the process proceeds to step S04.

In step S04, a check is made to confirm whether each wheel speed NW output by the multiple wheel speed sensors 37 is less than the predetermined regenerative operation prohibition wheel speed or not.

If the result is "NO," the process proceeds to step S05. In this step S05, the TCS requesting torque TT is set as the torque command TR and a series of processes is completed.

On the other hand, if the result is "YES," the process proceeds to step S06 and in this step S06, the TCS requesting torque as the torque command TR is set as zero, and a series of processes is completed.

Figures 3A, 3B:
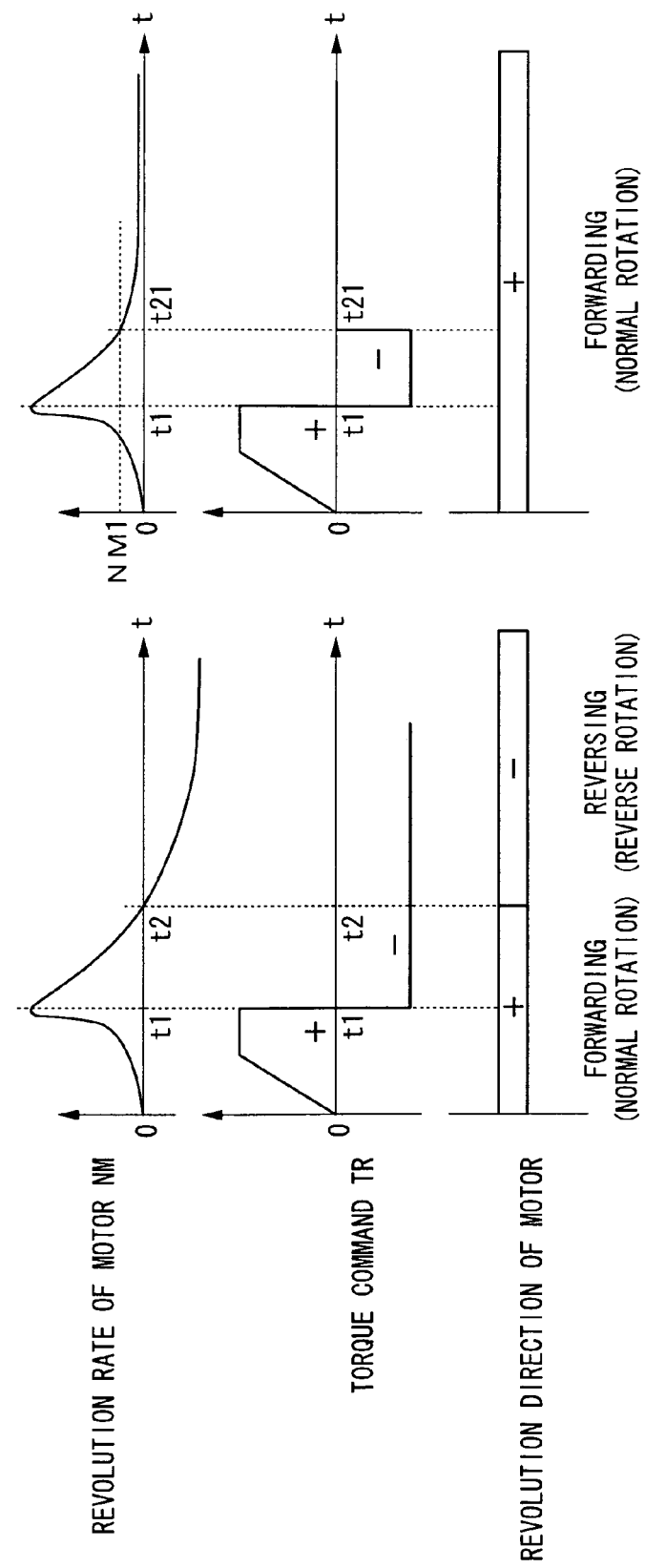
FIGS. 3A and 3B are diagrams showing graphs of motor revolution rate NM, torque command TR, and the direction of rotation of motor with time, in particular.

As a result, as shown in the comparative example of FIG. 3A, when the torque command TR is maintained in the negative value (or positive value) state, and the operation state of the electrical motor 16 has been set to change continuously from the normal rotation state (or reverse rotation state) to the stop state through the reverse rotation state (or normal rotation state), then firstly, the torque command TR corresponding to the electrical motor 16 in the normal rotation state changes the revolution rate NM to a decreasing trend according to the regenerative operation of electrical motor 16 after the time t1 for changing over from the positive value to the negative value, according to the negative value of the TCS requesting torque TT output from TCSECU 22. After time t2, the time required for the revolution rate NM of electrical motor 16 to reach zero, the changeover of the TCS requesting torque TT of TCSECU 22, that is, the TCS requesting torque TT incurs a delay in the timing for changing over from the negative value to the positive value or to zero, and the TCS requesting torque TT maintains the negative value. As a result, the torque command TR assumes a negative value, the electrical motor 16 changes from the normal rotation state to the reverse rotation state through the stop state, and the vehicle changes to the reversing state reflecting the will of the driver hoping to restore the gripping force of the tire of the driving wheels of the vehicle in the forwarding state.

In contrast, in the embodiment shown in FIG. 3B for example, the torque command TR for the electrical motor 16 in the normal rotation state changes the revolution rate NM to a decreasing trend according to the regenerative operation of motor 15 in timing t1 in which the positive value is changed to the negative value, corresponding to the TCS requesting torque TT of negative value output by TCSECU 22. Subsequently, the torque command TR becomes zero in the traction system torque calculation unit, regardless of the regeneration request output by the TCS requesting torque TT of negative value, that is by TCSECU 22 after timing t2 in which the revolution rate NM of the electrical motor 16 reaches the predetermined regenerative operation prohibition wheel speed, and prevents the electrical motor 16 from changing over to the reverse rotation state.

As mentioned above, the control apparatus 10 for the electrically-powered vehicle according to the embodiment of the present invention, prevents the vehicle from changing over to the reversing state reflecting the will of the driver when traction control is executed to appropriately and speedily increase the gripping force of the driving wheels by the regenerative operation of the motor, while permitting the execution state of continuously changing over the operation state of the motor from the normal rotation state (or the reverse rotation state) to the reverse rotation state (or the normal rotation state) through the stop state, when the torque command is maintained as a negative value (or a positive value) according to the execution request (regeneration request) of the regenerative operation for the motor in the settable running state, that is in the normal rotation state (or the reverse rotation state) of the electrically-powered vehicle.

In the above-mentioned embodiment, the traction system torque calculation unit 43 selects the smaller of the TCS requesting torque TT and the driver requesting torque TD, and if the TCS requesting torque TT is smaller than the driver requesting torque, the wheel speed NW is checked to confirm whether it is smaller than the predetermined regenerative operation prohibition wheel speed or not. However, the check is not limited to the above, and the revolution rate NM of the electrical motor 16 or an appropriate conditional value related to the revolution rate NM may be checked to confirm whether it is smaller than the predetermined regenerative prohibited threshold value or not.

What is claimed is:

1. A control apparatus for an electrically-powered vehicle that comprises an electrical motor that drives the vehicle, a motor control unit that controls drive and regenerative operations of the electrical motor based on a torque command that is a command value for a torque output by the electrical motor, and a traction control unit that controls a drive force that acts between tires and a road surface and suppresses spinning of driving wheels based on an operation request that indicates an operation state of the electrical motor, wherein the motor control unit is adapted to continuously change over the operation state of the electrical motor from a normal rotation state to a reverse rotation state through a stop state when the torque command is negative, the control apparatus comprising:

a driver requesting torque calculation unit that calculates a driver requesting torque, which is a command value for the torque output by the electrical motor, according to an opening degree of accelerator related to an amount of accelerator operation by a driver;

a traction requesting torque calculation unit that calculates a traction requesting torque, which is a command value for the torque output by the electrical motor, according to a drive force control by the traction control unit;

a torque command calculation unit that calculates the torque command based on the operation request, the driver requesting torque, and the traction requesting torque, during execution of the drive force control by the traction control unit; and a revolution rate sensor that measures a revolution rate of the electrical motor, wherein the torque command calculation unit is adapted to set the torque command to a value greater than zero regardless of the operation request when the revolution rate of the electrical motor or a conditional value related to the revolution rate is less than or equal to a predetermined value.

* * * * *